(12) United States Patent
Shahar et al.

(10) Patent No.: US 11,320,545 B2
(45) Date of Patent: May 3, 2022

(54) SYSTEMS AND METHODS FOR IMPROVED MEDICAL IMAGING

(71) Applicant: GE Precision Healthcare LLC, Wauwatosa, WI (US)

(72) Inventors: Arie Shahar, Moshav Magshimim (IL); Elhanan Blaut, Netanya (IL); Roi Harpaz, Holon (IL)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 29 days.

(21) Appl. No.: 16/922,735

(22) Filed: Jul. 7, 2020

(65) Prior Publication Data

US 2022/0011454 A1    Jan. 13, 2022

(51) Int. Cl.
*G01T 1/24* (2006.01)

(52) U.S. Cl.
CPC .............. *G01T 1/247* (2013.01); *G01T 1/241* (2013.01)

(58) Field of Classification Search
CPC ................................. G01T 1/247; G01T 1/241
See application file for complete search history.

(56) References Cited

U.S. PATENT DOCUMENTS

| | | |
|---|---|---|
| 2,257,361 A | 9/1941 | Yourkey |
| 3,206,652 A | 9/1965 | Monroe |
| 3,774,050 A | 11/1973 | Littwin |
| 4,419,618 A | 12/1983 | Gretsch |
| 4,421,986 A | 12/1983 | Friauf |
| 4,594,583 A | 6/1986 | Seko |
| 4,604,611 A | 8/1986 | Seko |

(Continued)

FOREIGN PATENT DOCUMENTS

| | | |
|---|---|---|
| DE | 3321921 A1 | 12/1984 |
| JP | S57201086 A | 12/1982 |

(Continued)

OTHER PUBLICATIONS

PCT Search Report and Written Opinion issued in connection with corresponding Application No. PCT/IL2014/050848 dated Feb. 5, 2015.

(Continued)

*Primary Examiner* — Christine S. Kim
(74) *Attorney, Agent, or Firm* — The Small Patent Law Group LLC; Dean D. Small

(57) ABSTRACT

A radiation detector assembly is provided that includes a semiconductor detector, plural pixelated anodes disposed on a surface of the semiconductor detector, and at least one processor. Each pixelated anode generates a primary signal responsive to reception of a photon by the pixelated anode. The at least one processor is operably coupled to the pixelated anodes, and determines when a primary signal is generated by a given pixelated anode. Responsive to determining the presence of the primary signal in the given pixelated anode, the at least one processor disconnects the given pixelated anode from an electrical source, wherein a re-directed primary signal is directed to a surrounding pixelated anode of the given pixelated anode. The at least one processor identifies the surrounding pixelated anode, and assigns an event for the primary signal to a pre-determined sub-pixel portion of the given pixelated anode based on the identified surrounding pixelated anode.

20 Claims, 11 Drawing Sheets

(56) References Cited

U.S. PATENT DOCUMENTS

| | | | |
|---|---|---|---|
| 4,837,607 A | 6/1989 | Kemmer | |
| 4,852,135 A | 6/1989 | Anisovich | |
| 4,885,620 A | 12/1989 | Kemmer | |
| 4,926,228 A | 5/1990 | Ashley | |
| 5,148,809 A | 9/1992 | Biegeleisen-Knight | |
| 5,239,179 A | 8/1993 | Baker | |
| 5,245,191 A | 9/1993 | Barber | |
| 5,273,910 A | 12/1993 | Tran | |
| 5,326,996 A | 7/1994 | McNutt | |
| 5,365,069 A | 11/1994 | Eisen | |
| 5,376,796 A | 12/1994 | Chan | |
| 5,504,334 A | 4/1996 | Jansen | |
| 5,561,330 A | 10/1996 | Crook | |
| 5,562,095 A | 10/1996 | Downey | |
| 5,672,954 A | 9/1997 | Watanabe | |
| 5,754,690 A | 5/1998 | Jackson | |
| 5,771,308 A | 6/1998 | Florent | |
| 5,813,712 A | 9/1998 | Mozelt | |
| 5,825,033 A | 10/1998 | Barrett | |
| 5,847,398 A | 12/1998 | Shahar | |
| 5,905,624 A | 5/1999 | Andreica | |
| 6,002,741 A | 12/1999 | Eisen | |
| 6,034,373 A | 3/2000 | Shahar | |
| 6,140,650 A | 10/2000 | Berlad | |
| 6,169,287 B1 | 1/2001 | Warburton | |
| 6,239,438 B1 | 5/2001 | Schubert | |
| 6,388,244 B1 | 5/2002 | Gagnon | |
| 6,535,229 B1 | 3/2003 | Kraft | |
| 6,618,185 B2 | 9/2003 | Sandstrom | |
| 6,748,044 B2 | 6/2004 | Sabol | |
| 6,943,355 B2 | 9/2005 | Shwartz | |
| 7,026,623 B2 | 4/2006 | Oaknin | |
| 7,187,790 B2 | 3/2007 | Sabol | |
| 7,381,959 B2 | 6/2008 | Manjeshwar | |
| 7,490,085 B2 | 2/2009 | Walker | |
| 7,495,228 B1 | 2/2009 | Albagll | |
| 7,508,509 B2 | 3/2009 | Lehtikoski | |
| 7,668,288 B2 | 2/2010 | Conwell | |
| 7,671,331 B2 | 3/2010 | Hefetz | |
| 7,692,156 B1 | 4/2010 | Nagarkar | |
| 8,269,180 B2 | 9/2012 | De Geronimo | |
| 8,280,124 B2 | 10/2012 | Dichterman | |
| 8,405,038 B2 | 3/2013 | Bouhmk | |
| 8,492,725 B2 | 7/2013 | Zilberstein | |
| 8,837,793 B2 | 9/2014 | Rousso | |
| 9,002,084 B2 | 4/2015 | Shahar | |
| 9,482,764 B1 | 11/2016 | Shahar | |
| 9,632,186 B2 | 4/2017 | Shahar | |
| 10,324,202 B1 | 6/2019 | Shahar | |
| 10,481,285 B1 | 11/2019 | Shahar | |
| 10,976,452 B2* | 4/2021 | Shahar | G01T 7/005 |
| 11,092,701 B1* | 8/2021 | Shahar | G01T 1/2921 |
| 2002/0191828 A1 | 12/2002 | Colbeth | |
| 2003/0054563 A1 | 3/2003 | Ljungstrom | |
| 2003/0099026 A1 | 5/2003 | Sandstrom | |
| 2003/0128324 A1 | 7/2003 | Woods | |
| 2003/0153830 A1 | 8/2003 | Weinberg | |
| 2004/0021082 A1 | 2/2004 | Wong | |
| 2004/0174949 A1 | 9/2004 | Yamashita | |
| 2004/0195512 A1 | 10/2004 | Crosetto | |
| 2005/0139777 A1 | 6/2005 | Rostaing | |
| 2005/0145797 A1 | 7/2005 | Oaknin | |
| 2005/0251010 A1 | 11/2005 | Mistretta | |
| 2006/0086913 A1 | 4/2006 | Spahn | |
| 2006/0108532 A1 | 5/2006 | Ohana | |
| 2006/0113482 A1 | 6/2006 | Pelizzari | |
| 2006/0249682 A1 | 11/2006 | Hogg | |
| 2006/0285751 A1 | 12/2006 | Wu | |
| 2007/0018108 A1 | 1/2007 | Kitamura | |
| 2007/0023669 A1 | 2/2007 | Hefetz | |
| 2007/0025522 A1 | 2/2007 | Fenster | |
| 2007/0173719 A1 | 7/2007 | Haider | |
| 2007/0235657 A1 | 10/2007 | He | |
| 2007/0290142 A1 | 12/2007 | Du | |
| 2008/0001090 A1 | 1/2008 | Ben-Haim | |
| 2008/0029704 A1 | 2/2008 | Hefetz | |
| 2008/0033291 A1 | 2/2008 | Rousso | |
| 2008/0039721 A1 | 2/2008 | Shai | |
| 2008/0042070 A1 | 2/2008 | Levin | |
| 2008/0092074 A1 | 4/2008 | Cohen | |
| 2008/0149842 A1 | 6/2008 | El-Hanany | |
| 2008/0230709 A1 | 9/2008 | Tkaczyk | |
| 2009/0070121 A1 | 3/2009 | Leonelli | |
| 2009/0080601 A1 | 3/2009 | Tkaczyk | |
| 2009/0110144 A1 | 4/2009 | Takahashi | |
| 2010/0261997 A1 | 10/2010 | Ren | |
| 2010/0308817 A1 | 12/2010 | Vija | |
| 2011/0026685 A1 | 2/2011 | Zilberstein | |
| 2011/0103544 A1 | 5/2011 | Hermony | |
| 2011/0147594 A1 | 6/2011 | Scoullar | |
| 2011/0155918 A1 | 6/2011 | Bouhnik | |
| 2011/0204245 A1 | 8/2011 | Robert | |
| 2011/0210235 A1 | 9/2011 | Dierickx | |
| 2011/0240865 A1 | 10/2011 | Frach | |
| 2012/0108948 A1 | 5/2012 | Jansen | |
| 2012/0205542 A1 | 8/2012 | Goedicke | |
| 2013/0168567 A1 | 7/2013 | Wartski | |
| 2014/0048714 A1 | 2/2014 | Shahar | |
| 2014/0126793 A1 | 5/2014 | Ahn | |
| 2014/0158890 A1 | 6/2014 | Pistorius | |
| 2014/0163368 A1 | 6/2014 | Rousso | |
| 2014/0343400 A1 | 11/2014 | Toshiba | |
| 2015/0063671 A1 | 3/2015 | Shahar | |
| 2015/0131776 A1 | 5/2015 | Cho | |
| 2015/0192681 A1 | 7/2015 | Cho | |
| 2016/0245934 A1 | 8/2016 | Shahar | |
| 2017/0000448 A1 | 1/2017 | Hefetz | |
| 2017/0014096 A1 | 1/2017 | Bouhnik | |
| 2017/0269240 A1 | 9/2017 | Shahar | |
| 2017/0350995 A1 | 12/2017 | Stanchina | |
| 2020/0251236 A1* | 8/2020 | Daerr | G21K 1/025 |
| 2020/0393576 A1* | 12/2020 | Harris | G01T 1/171 |

FOREIGN PATENT DOCUMENTS

| | | |
|---|---|---|
| JP | S60218870 A | 11/1985 |
| WO | 1997014060 A1 | 4/1997 |
| WO | 2008135994 A2 | 11/2008 |
| WO | 2009036078 A2 | 3/2009 |
| WO | 2014173812 A1 | 10/2014 |

OTHER PUBLICATIONS

Meikle et al., "Accelerated EM reconstruction in total-body PET: potential for improving tumour detectability," 1994, Physics in Medicine and Biology, vol. 39, pp. 1689-1704.

Park et al., "Performance of a high-sensitivity dedicated cardiac SPECT scanner for striatal uptake quantification in the brain based on analysis of projection data," Med. Phys. 40 (4), Apr. 2013.

Riddell et al., "Noise reduction in oncology FDG PET images by iterative reconstruction: a quantitative assessment," 2001, the Journal of Nuclear Medicine, vol. 42, No. 9, pp. 1316-1323.

Shepp et al., "Maximum likelihood reconstruction for emission tomography," 1982, IEEE Transaction on Medical Imaging, vol. MI-1, No. 2, pp. 113-121.

International Search Report and Written Opinion dated Jul. 15, 2016 for corresponding PCT Application No. PCT/US2016/029465 filed Apr. 27, 2016 (11 pages).

Warburton, An Approach to Sub-Pixel Spatial Resolution in Room Temperature X-Ray Detector Arrays with Good Energy Resolution. X-ray Instrumentation Associates (XIA), 2513 Charleston Road STE 207, Mountain View, CA 94043-1607, USA.

Iwanczyk et al., "Photon Counting Energy Dispersive Detector Arrays for X-ray Imaging" IEEE Trans Nucl Sci. 2009 ; 56(3): 535-542. doi:10.1109/TNS.2009.2013709. (27 pages).

Zhu, "Digital Signal Processing Methods for Pixelated 3-D Position Sensitive Room-Temperature Semiconductor Detectors" (2012) p. 1-184, available at: https://deepblue.lib.umich.edu/handle/2027.42/91490.

Barrett, "Charge Transport in Arrays of Semiconductor Gamma-Ray Detectors," H.H. Barrett, Physical Review Letters, vol. 75, No. 1, Jul. 1995.

(56) References Cited

OTHER PUBLICATIONS

Eskin, "Signals Induced in Semiconductor Gamma-Ray Imaging Detectors," J.D. Eskin, Journal of Applied Physics, vol. 85, No. 2, Jan. 1999.

Niemela, "High-Resolution p-i-n CdTe and CdZnTe X-Ray Detectors with Cooling and Rise-Time Discrimination," IEEE Transactions on Nuclear Science, vol. 43, No. 3, Jun. 1996.

* cited by examiner

SYSTEMS AND METHODS FOR IMPROVED MEDICAL IMAGING

BACKGROUND OF THE INVENTION

The subject matter disclosed herein generally relates to the field of radiation detectors, for example to semiconductor radiation detectors that may be used in medical imaging, such as, Nuclear Medicine (NM), Nuclear Imaging (NI) and Molecular Imaging (MI), and may be used in imaging systems, such as, nuclear and molecular imaging cameras, Single Photon Emission Computed Tomography (SPECT), Computed Tomography (CT) and Positron Emission Tomography (PET).

Radiation detectors may use pixelated anodes to identify locations of received photons. Generally, the smaller the pixels, the higher the intrinsic spatial resolution. However, using a large number of small pixels may result in an excess number of electronic channels, with each pixel having its own associated electronic channel. A high number of electronic channels may result in relatively high heat and low yield. Further, a high number of small pixels presents manufacturing challenges.

Another approach is to use virtual sub-pixelization, using relatively larger physical pixels divided into virtual sub-pixels, with photon absorption locations determined based on induced charges in one or more neighboring pixels. However, the induced charges on neighboring pixels may be relatively low, resulting in less than ideal signal-to-noise ratio (SNR) which may lead to errors in determining position. Further, the required electronics may be relatively complicated.

BRIEF DESCRIPTION OF THE INVENTION

In one embodiment, a radiation detector assembly is provided that includes a semiconductor detector, plural pixelated anodes, and at least one processor. The semiconductor detector has sidewalls and a surface. The plural pixelated anodes are disposed on the surface. Each pixelated anode is configured to generate a primary signal responsive to reception of a photon by the pixelated anode. The at least one processor is operably coupled to the pixelated anodes, the at least one processor configured to determine when a primary signal is generated by a given pixelated anode. Responsive to determining the presence of the primary signal in the given pixelated anode, the at least one processor disconnects the given pixelated anode from an electrical source, wherein a re-directed primary signal is directed to a surrounding pixelated anode of the given pixelated anode. The at least one processor is also configured to identify the surrounding pixelated anode, and assign an event for the primary signal to a pre-determined sub-pixel portion of the given pixelated anode based on the identified surrounding pixelated anode.

In another embodiment, a method for imaging is provided. The method includes generating a primary signal in a given pixelated anode of plural pixelated anodes disposed on a surface of a semiconductor detector responsive reception of a photon by the given pixelated anode. The method also includes determining the presence of the primary signal responsive to the primary signal reaching a trigger level. Further, the method includes, responsive to determining the presence of a primary signal in a given pixelated anode, disconnecting the given pixelated anode from an electrical source, wherein a re-directed primary signal is directed to a surrounding pixelated anode of the given pixelated anode. Also, the method includes identifying the surrounding pixelated anode, and assigning an event for the primary signal to a pre-determined sub-pixel portion of the given pixelated anode based on the identified surrounding pixelated anode.

In another embodiment, a method for providing a radiation detector assembly is provided. The method includes providing a semiconductor detector having sidewalls and a surface. The method also includes providing plural pixelated anodes disposed on the surface, with each pixelated anode configured to generate a primary signal responsive to reception of a photon by the pixelated anode. Also, the method includes assigning predetermined sub-pixel portions to at least one of the plural pixelated anodes. Further, the method includes assigning a corresponding surrounding pixelated anode to each sub-pixel portion, wherein the radiation detector assembly is configured to assign an event to each sub-pixel portion of the given pixelated anode based on identification of a re-directed primary signal in the corresponding surrounding pixelated anode.

DETAILED DESCRIPTION OF THE INVENTION

Figure 1:
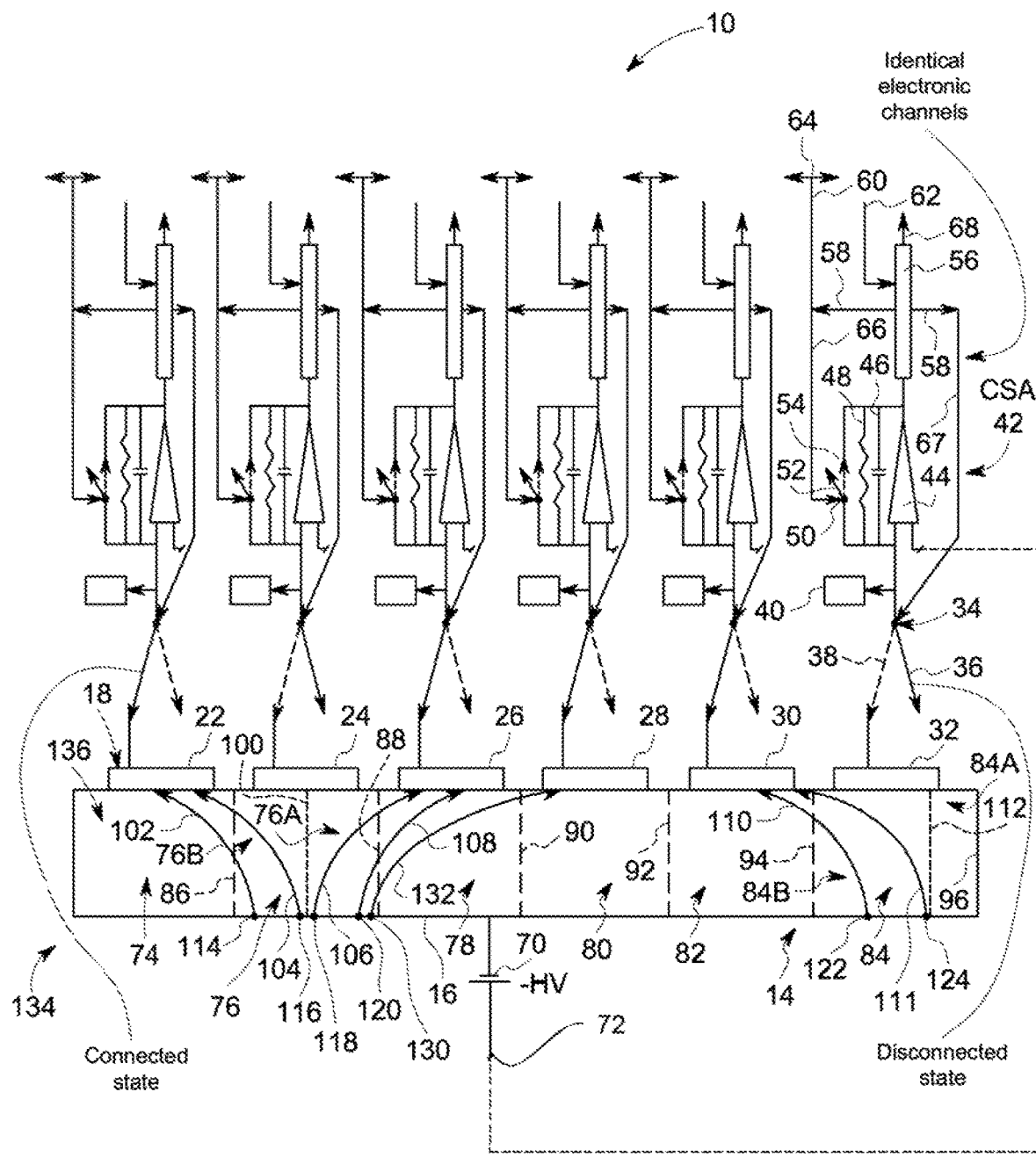
FIG. 1 provides a schematic illustration of a radiation detector circuit in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" of are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide radiation detectors with improved identification of position of received radiation, for example by accurately and conveniently identifying sub-pixel location of received photons. Various embodiments utilize a relatively lower number of electronic channels and/or relatively less complex electronic channels than alternate approaches, providing improved heat dissipation and improved yield. Various embodiments provide high positional accuracy by using primary signals from collected events instead of induced signals from events collected by other pixels (or non-collected events) for sub-pixel identification. Various embodiments provide efficient and accurate use of virtual sub-pixels, allowing use of relatively larger physical pixels, resulting in simplified manufacturing, reduced charge-sharing and improved yield.

It may be noted that the sub-pixels or sub-pixel portions in the illustrated examples are not physically separate, but instead are virtual entities (e.g., defined by one or more processing units). Accordingly, unlike physically separate pixels, sub-pixels do not require individual electronic channels. As such, dividing pixels into virtual sub-pixels improves intrinsic spatial resolution while not requiring additional electronic channels. Generally, the use of increasing numbers of sub-pixels per pixel improves resolution while also increasing computational or processing requirements. The particular number of sub-pixels defined or employed in a given application may be selected based on a balance between improved resolution against increased processing requirements. In various embodiments, the use of virtual sub-pixels as discussed herein provides improved resolution while avoiding or reducing costs associated with increasingly larger number of increasingly smaller pixelated anodes.

A technical effect provided by various embodiments includes improved resolution and/or sensitivity of radiation detectors. A technical effect of various embodiments includes reduced time, cost, and/or complexity for assembling radiation detector assemblies.

Generally, various embodiments utilize disconnected pixels in connection with virtual sub-pixelization. For example, events (e.g., received or absorbed photons) in an unbiased disconnected pixel, which is electrically floating, migrate out of that unbiased pixel to one or more neighboring pixels that are at a higher voltage than the disconnected pixel. The specific neighbor pixel into which the events migrate depends on the position relative to the unbiased disconnected pixel. Accordingly, the specific neighbor pixel that collects a given event migrating out from the disconnected pixel identifies the virtual sub-pixel in the disconnected pixel to which the event belongs.

FIG. 1 is a schematic illustration of a radiation detector assembly 10 including detector 134, along with electronics integrated to or otherwise associated with the detector 134. Generally, the radiation detector assembly 10 is configured to selectively disconnect anodes responsive to the origination of events (e.g., absorbed photons) under a receiving anode. When a photon is absorbed under a given anode, that anode is disconnected to cause the event to migrate to one or more neighboring anodes. The particular anode(s) to which the event migrates are used to determine a sub-pixel location for the event for the given anode under which the photon was originally absorbed.

The depicted detector 134 includes a monolithic cathode 16 and opposed pixelated anodes 18. The cathode 16 and anodes 18 are applied on a semiconductor bulk 136, which may be made of, for example, CdZnTe (CZT). The anodes 18 include (from left to right) anodes 22, 24, 26, 28, 30, and 32 under which corresponding pixels/voxels 74, 76, 78, 80, 82, and 84 are located in bulk 136, respectively. Boundary lines (from left to right) 86, 88, 90, 92 and 94 show boundaries between neighboring pixels 18 or their corresponding voxels. In the illustrated example, the cathode 16 is biased by a negative High Voltage (−HV) source 70 that its positive side is connected to a common ground 72. Cathode 16 is the radiation receiving side of detector 134 when the radiation generally directed in orientation 14 toward cathode 16 of detector 134

It should be noted that the electronics in various embodiments may be discrete electronics, or, as another example, formed on one or more application specific integrated circuit (ASIC). As shown in FIG. 1, the electronics includes multiple similar (e.g., identical) electronic channels 12. Each electronic channel is coupled to a particular one of the anodes 18 of detector 134. Each electronic channel 12 includes a switch 34 that is movable between a closed state 38 and an open state 36. In the closed (or connected) state 38, the corresponding anode 18 is biased and used to collect a signal corresponding to an event moving under the corresponding anode 18. In the open state 36, the corresponding anode 18 is unbiased and does not collect a signal. When the electronic channel 12 for a given anode 18 is in the open (or disconnected) state, events undert that anode 18 migrate to neighboring anodes 18 that are in the closed (or connected)

state. In the illustrated example of FIG. 1, anodes 24 and 32 are in the open or disconnected state 36, and anodes 22, 26, 28, and 30 are in the closed or connected state 38.

In the illustrated example, the switches 34 provide selectable connections between corresponding anodes 18 and charge sensitive amplifiers (CSA's) 42. Each CSA 42 includes an operational amplifier 44, a feedback capacitor 46, feedback resistor 48, and a switch 50 that is open at state 52 and is closed at state 54. Block 56 represents the rest of the electronic channel 12 that may include one or more of (not shown) a shaper, a comparator (e.g., to set a threshold level), a triggering unit, amplifiers, a Peak & Hold unit (P&H), or a readout unit. The block 56 (and electronic channel 12) includes an output 68. The triggering unit produces a triggering signal 58 when the signal from anodes 18 reaches a predefined value. The triggering signal 58 is transferred via lines 60 and 64 to neighboring channels 12. The neighboring channels 12 receive the trigger signal 58 via lines 62 and 64, and, responsive to the trigger signal 58, activate their readout units to read events migrated to the corresponding anodes 18 to which they are connected. Also, in the illustrated example, the trigger signal 58 is transferred to the switch 50, via line 66, to close the switch 50 at state 54 to discharge feedback capacitor 46, and to reset its voltage to zero. Then, after a time Δt that is substantially equal to the rise time of the signal on the anode 18, switch 50 returns to its default open state 52. The trigger signal 58 is also transferred, via line 67, to switch 34 to open the switch 34 (e.g., move switch 34 from its closed state 38 to its open state 36 to disconnect anode 18) to lower its voltage by making the anode 18 floating. After the time Δt that is substantially equal to the rise time of the signal on the anode 18, the switch 34 returns to its default closed state 38 to be ready for the next event. It may be noted that the direct current (DC) compensation unit 40 of the illustrated example is a slow response unit, to help ensure that the DC current to the input of the CSA 42 is zero. This may be accomplished by pulling DC current that is equal to the leakage current of the detector.

Next, the operation of the radiation detector assembly 10 responsive to received events will be discussed. When the detector 134 absorbs radiation in its bulk 136, events (e.g., events 114, 116, 118, 120, 130) may be produced in pixel/voxel 76 under anode 24 and/or events (e.g., events 122 and 124 under anode 32) may be produced in pixel/voxel 84 under anode 32. As shown in FIG. 1, events 114, 116, 118, 120, 122, and 124 move along trajectories 102 104, 106, 108, 110 and 111, respectively. When an event originates, its electrical charge moves along the electrical field lines (trajectories) and it induces an electrical charge on a corresponding anode 18 under which it is moving.

For example, event 118 that moves along trajectory 106. When event 118 moves along trajectory 106 underneath anode 24 it induces an electrical charge on the anode 24. When the signal on anode 24, processed by electronic channel 12, reaches the triggering level (e.g., a predetermined threshold set above a maximum value for a charge induced by reception of a photon on an adjacent pixel, for example to help ensure that the trigger will be activated only by a primary signal generated by an event produced under anode 24 and not by a non-collected induced signal generated by an event produced in one of the pixels adjacent to pixel 24, switch 34 is triggered by signal 58, via line 67, to move to its open state 36. Accordingly, anode 24 moves to a floating state and the event 118 is drifted toward anode 26, which now has a potential that is much higher than the potential (voltage) of now floating anode 24. The event 118 is then collected and measured by the anode 26. Accordingly, the event 118 originated under anode 24. Once the signal generated responsive to the origination of event 118 reached a threshold identifying the signal as a primary signal for anode 24 (e.g., a signal generated by reception of a photon underneath anode 24), anode 24 is disconnected, causing the event 118 to migrate to neighboring pixel 26, where the event 118 is collected.

Events 118 and 120 in virtual sub-pixel/subvoxel 76A (located on the right side of pixel 76 and bounded by dashed line 100 representing a boundary between virtual sub-pixel 76A and virtual sub-pixel 76B) of physical pixel/voxel 76 will migrate and be collected by anode 26. Similarly, events 114 and 116 in virtual subpixel/subvoxel 76B of physical pixel/voxel 76 will migrate and be collected by anode 22. Virtual subpixels 76A and 76B of physical pixel 76 are on the right and left sides of symmetry line 100 of pixel 76. Accordingly, after disconnecting anode 24, the events collected by anode 26 are events identified as events produced in subpixel 76A and events collected by anode 22 are events identified as events produced in subpixel 76B. Similarly, after disconnecting anode 32, events 122 and 124 collected by anode 30 are events identified as events produced in subpixel 84B and events collected by other anodes 18 adjacent to pixel/voxel 84 are events identified as events produced in subpixel/subvoxel 84A. It may be noted that, unlike symmetry line 100 of pixel 76, line 112 in pixel 84 is not necessarily the symmetry line of pixel 84, since the sidewall of detector 134 may affect the symmetry of the sidewall pixels such as pixel 32. For example, events 118 and 120 (or events 114 and 116), after a time Δt that is substantially equal to the risetime of the signal on anode 26 (or anode 22), the corresponding switch 34 returns to its default closed state 38 to be ready for the next event.

In various embodiments, upon reaching the triggering level and the creation of the triggering signal 58, the switch 50 may be moved to closed state 54 to clamp the CSA voltage to zero, to help avoid or reduce transient and switching noise in pixel/voxel 76. This continues during the rise time Δt until the event 118 is collected by the anode 26. After the rise time Δt, the switch 50 returns to its default open state 52 to be ready for the next event. At the same times during which the switch 50 is turned to the closed state 54 and open state 52, the corresponding P&H unit is disabled and enabled, respectively, to help avoid any reading of transient or switching noise in pixel/voxel 76.

Upon the creation of the triggering signal 58 in lines 60 and 64 in the electronic channel 12 of the anode 24, and the receipt of the triggering signal 58 via lines 62 of channels 12 of surrounding pixels (e.g., anodes 22 and 26), the readout units in block 56 of channels 12 of the anodes surrounding anodes 24 (e.g., anodes 22 and 26) are activated to measure events migrating out from pixel/voxel 76 to pixels/voxels 74 and/or 78. At a similar time, the triggering unit at these pixels is disabled to avoid potential interference with other events that may be generated at these pixels during the reading of events migrating out from pixel/voxel 76. The corresponding triggering units return to an enabled state after the completion of the reading of events migrating from pixel/voxel 76 to pixels/voxels 74 and/or 78.

It may also be noted that, after the switching cycle to the open state 36 and then back to the closed state 38 of switch 34, the DC current at the input of the corresponding CSA 42 remains zero, because the DC compensator 40 is too slow to follow the current changes happening during the fast switching.

Further, the above discussed examples relate to migration of events to an immediately adjacent pixel. However, other pixels may receive a migrated event. For example, when the migration phenomenon is strong enough, an event such as event 130 may move along trajectory 132 to migrate from the pixel/voxel 76 to a pixel/voxel 80 which is not immediately adjacent to pixel/voxel 76, but is instead one pixel/voxel away from the pixel/voxel 76, or is located in a second ring of pixels surrounding pixel/voxel 76 (where the first ring includes immediately adjacent pixels).

Figure 2:
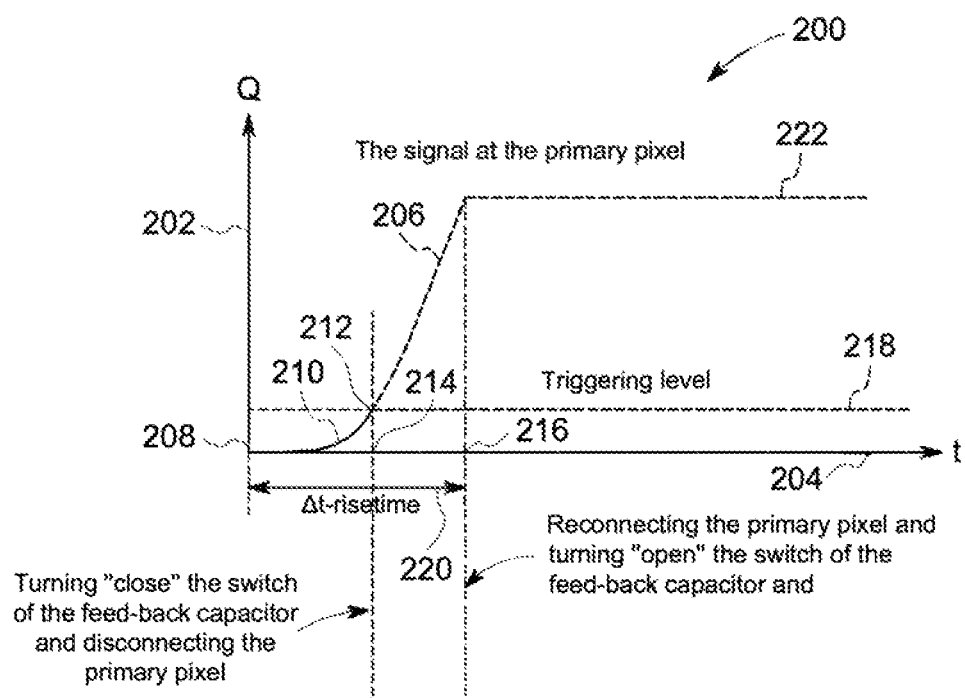
FIG. 2 illustrates a plot of the charge on a primary anode for which an event is generated but not collected versus time t in accordance with various embodiments.
Figure 3:
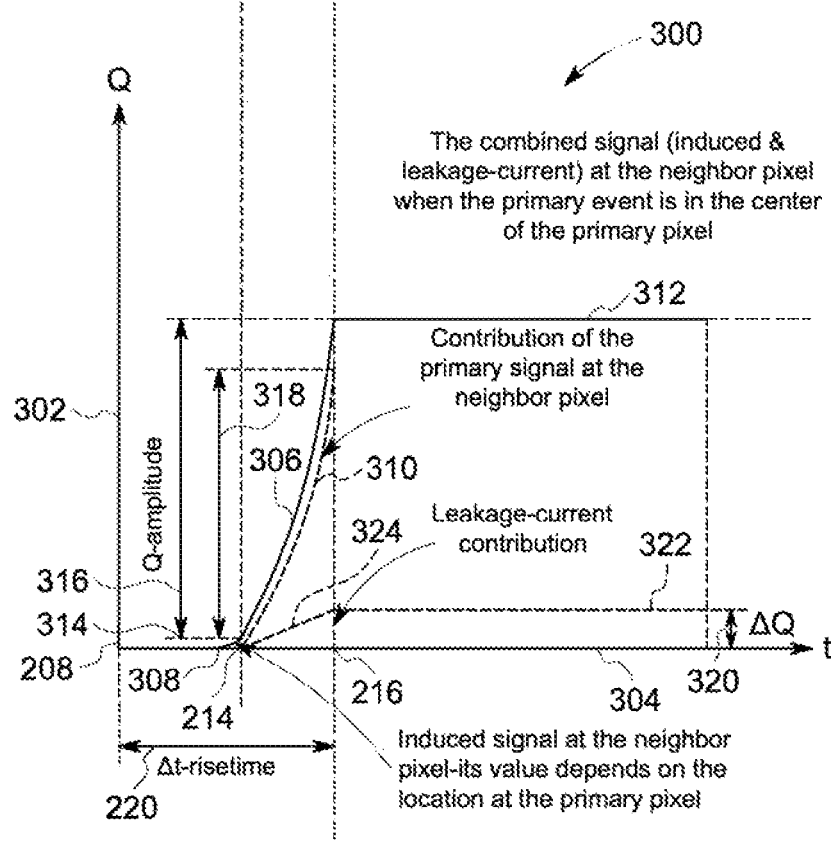
FIG. 3 illustrates a plot of the charge on a secondary anode for which an event is collected but not generated versus time t in accordance with various embodiments.

FIGS. 2 and 3 provide graphs 200 and 300 of an induced charge Q versus the time t, for generation and collection of event 118, respectively. FIG. 2 schematically shows a charge Q (202) on the primary anode 24 of the primary pixel/voxel 76 in which the event 118 is generated, versus the time t (204). FIG. 3 schematically shows the charge Q (302), on the secondary anode 26 of the secondary pixel/voxel 78, which collects the event 118 (e.g., after primary anode 24 is disconnected) generated in the pixel/voxel 76 and migrated to the pixel/voxel 78, versus the time t (304). It should be noted that while switch 34 is schematically illustrated as a two state switch that has one state that is a connected or closed state and a second state that is a disconnected or open state, switch 34 may be of any type of components having at least two states, one state with low resistance corresponding to closed or connected state and the second state with high resistance corresponding to disconnected or open state. Switch 34 may include components, such as, for example, gate, Field Effect Transistor (FET), bipolar transistor, operational-amplifier, Metal Oxide Semiconductor (MOS), or Complementry MOS (CMOS). The disconnected state of switch 34 should have a resistance that is high enough to produce a voltage divider together with the bulk resistivity under the disconnected anode 18, to reduce the voltage of this anode 18 to a value that is low enough to cause migration of events from this anode 18 to its adjacent pixels. The connected state of switch 34 should have a resistance that is low enough to prevent migration of events from anode 18, to which switch 34 is connected, to its adjacent pixels. Accordingly, it should be understood that disconnecting a certain pixel/anode 18 may either be a physical disconnection of anode 18 as illustrated by switch 34 of FIG. 1 or may include the application of high resistance, by switch 34, between the disconnected anode 18 and the input of CSA 42.

FIG. 2 shows a curve 206 that has a plateau 222 in dashed lines illustrating how the charge Q would have been developed on the anode 24 of the detector 134 if the switch 34 had remained closed at state 38 during the entire time period from generation to collection of event 118. Curve 210, in solid lines, shows the curve that results from disconnecting the anode 24 after determination that event 118 is a photon reception that originated under the anode 24. As seen in FIG. 2, curve 210 shows the rise of the induced charge Q on the anode 24 while the "small pixel effect" exists. Q rises from Q=0 at t=0 (208) until it reaches value 212, which is at the triggering level 218. When Q reaches the triggering level 218, the switch 34 moves to the open state 36 (FIG. 1) at time 214, disconnecting the anode 24 so that the anode 24 is unbiased. Slightly before the switch 34 changes its state to open state 36, the switch 50 moves to the closed state 54 and clamps the value of induced charge Q to zero at time 214. After a time that is substantially equal to the risetime Δt (220) from time 214, the switch 34 returns to a default closed state 38 and the switch 50 returns to a default open state 52, to be ready for the next event. At this point pixel/voxel 76 and anode 24 (which were the primary pixel/voxel and anode for event 118) are ready for the next event when Q=0.

Generally, the triggering level is set high enough to help ensure that only primary events reach the triggering level, but low enough to provide time for the event to migrate and have sufficient collected charge under a neighboring anode.

For the case depicted in FIG. 2, no signal is outputted at output 68 by channel 12 of the anode 24 (for pixel/voxel 76), since the corresponding P&H unit is disabled between times 214 and 216 (the time between triggering and collection), and blocks the signal there. In addition, the signal Q on anode 24 is a transient pulse signal and is strongly attenuated by the shaper in block 56, thus not passing the threshold for counting an event of channel 12. Further still, the maximum value of Q before the shaper is equal to the triggering level 218. In the illustrated embodiment, the triggering level is only about 15% of the maximum possible signal.

FIG. 3 shows a curve 306 and plateau 312 illustrate the total charge Q (302) developed on the secondary (or collecting anode under which the event does not originate) anode 26 of the detector 134 for event 118 versus the time t (304) in three different time-periods. The first time-period starts at t=0 (208) when switch 34 is closed at state 38 for anode 26 and ends at time 214 when switch 34 is opened at state 36 to disconnect anode 24 of pixel/voxel 76, the second time-period starts after point 214 and ends at point 216 when switch 34 returns to its default state 38 to reconnect anode 24 of pixel/voxel 76 and the third time-period starts after point 216 after switch 34 returns to its default state 38 at a time that is substantially equal to the risetime Δt (220). Curve 306 includes the contribution of the induced signal Q 310 on the anode 26 of pixel/voxel 78 by the event 118 and the contribution 324 of the additional leakage current to the charging of feedback capacitor 46. The additional leakage current is the current added immediately to the leakage current of pixels 74 and 78 when pixel 76 is disconnected. When pixel 76 is disconnected its leakage current is divided between the neighboring pixels 74 and 78 and its contribution to the signal Q of pixel 78 is shown by line 324.

Curve 310 shows the rise of the induced charge Q on the secondary anode 26 while the "small pixel effect" exists. As seen in FIG. 3, Q for pixel/voxel 78 (anode 26) that is adjacent to the pixel/voxel in which the event 118 originates, rises from Q=0 and t=0 at 208 until it reaches value 314 at time 214 and point 308 when pixel/voxel 76 (anode 24) in which the event originated is disconnected by switch 34. Then, from time 214 until time 216 that is substantially equal to the risetime Δt 220 of the induced signal on the anode 26, the curve 310 reaches its plateau 312. After the anode 24 is disconnected, the event migrates under the anode 26 for eventual collection by anode 26 and the curve 306 or plateau 312 generally resembles a primary signal curve. At time 214 in which the switch 34 is disconnected for pixel/voxel 76, the extra leakage current in the pixel/voxel 78 starts to contribute to the signal Q according to line 324 of FIG. 3. Contribution 324 continues until switch 34 is actuated to reconnect pixel/voxel 76 at time 216, at which point the extra leakage current stops. From point 216 the contribution of the leakage current is constant at plateau 322 having value 320.

For the case depicted in FIG. 3, the total amplitude Q 316 of the signal developed on the anode 26 is equal to the contribution of the leakage current according to line 324 at amplitude 320, added to the contribution of the induced charge according to curve 310 at amplitude 318 with the additional contribution of the induced charge Q prior to the opening of the switch 34 at amplitude 314. Generally, the contribution of amplitude 320 of the leakage current is relatively small and may be strongly attenuated by the shaper of the corresponding block 56 since it is a shallow ramp pulse signal. In addition, this contribution is fixed and may be eliminated by an offset value derived by spectrum calibration of pixel 78. Accordingly, only the net signal induced on pixel 78 (anode 26) may be derived.

Figure 4:
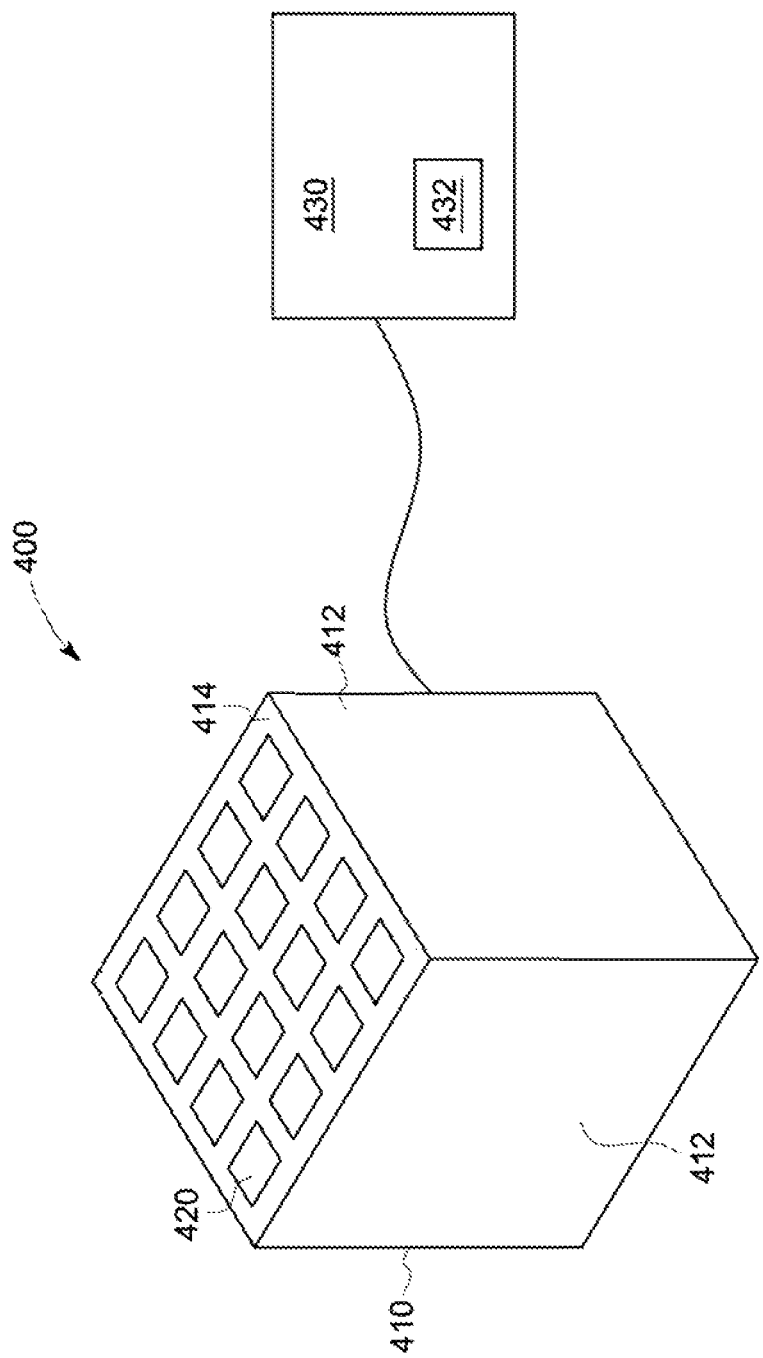
FIG. 4 provides a block schematic view of a radiation detector assembly in accordance with various embodiments.

FIG. 4 provides a block schematic view of radiation detector assembly 400 in accordance with various embodiments. The radiation detector assembly 400 includes a semiconductor detector 410, plural pixelated anodes 420, and a processing unit 430 including a memory 432. Generally, the semiconductor detector 410 and pixelated anodes 420 generate electrical signals in response to received radiation, and the processing unit 430 uses the signals to assign events to virtual sub-pixels defined for each pixelated anode 420. The radiation detector assembly 400 in various embodiments incorporates or utilizes one or more aspects discussed in connection with FIGS. 1-3.

The semiconductor detector 410 includes sidewalls 412 and a surface 414. The semiconductor detector, for example, may be made of a CZT semiconductor plate.

The plural pixelated anodes 420 are disposed on the surface 414 of the semiconductor detector 410. A cathode (e.g., a monolithic cathode) (not shown in FIG. 4) may be disposed on another surface (e.g., an opposing surface) of the semiconductor detector 410. Generally, the pixelated anodes 420 generate electrical signals responsive to reception of photons by the radiation detector assembly 400. In the depicted embodiment, each pixelated anode 420 is configured to generate a primary signal responsive to reception of a photon in a volume (voxel) associated with (e.g., located underneath) the pixelated anode 420.

The processing unit 430 is configured (e.g., programmed) to determine when a primary signal is generated by a given pixelated anode. Then, responsive to determining the presence of the primary signal in the given pixelated anode, the processing unit 430 disconnects the given pixelated anode from an electrical source (e.g., via switch 34). When the given pixelated anode under which the primary signal originated is disconnected, the primary signal is re-directed toward an anode having a voltage bias, causing a re-directed primary signal to be directed to a surrounding pixelated anode of the given pixelated anode 420. The processing unit 430 is configured to identify the surrounding pixelated anode which collects the re-directed charge from the event, and to assign an event for the primary signal to a pre-determined sub-pixel portion of the given pixelated anode based on the identified surrounding pixelated anode (i.e., the anode that eventually collects the re-directed charge).

Figure 5:
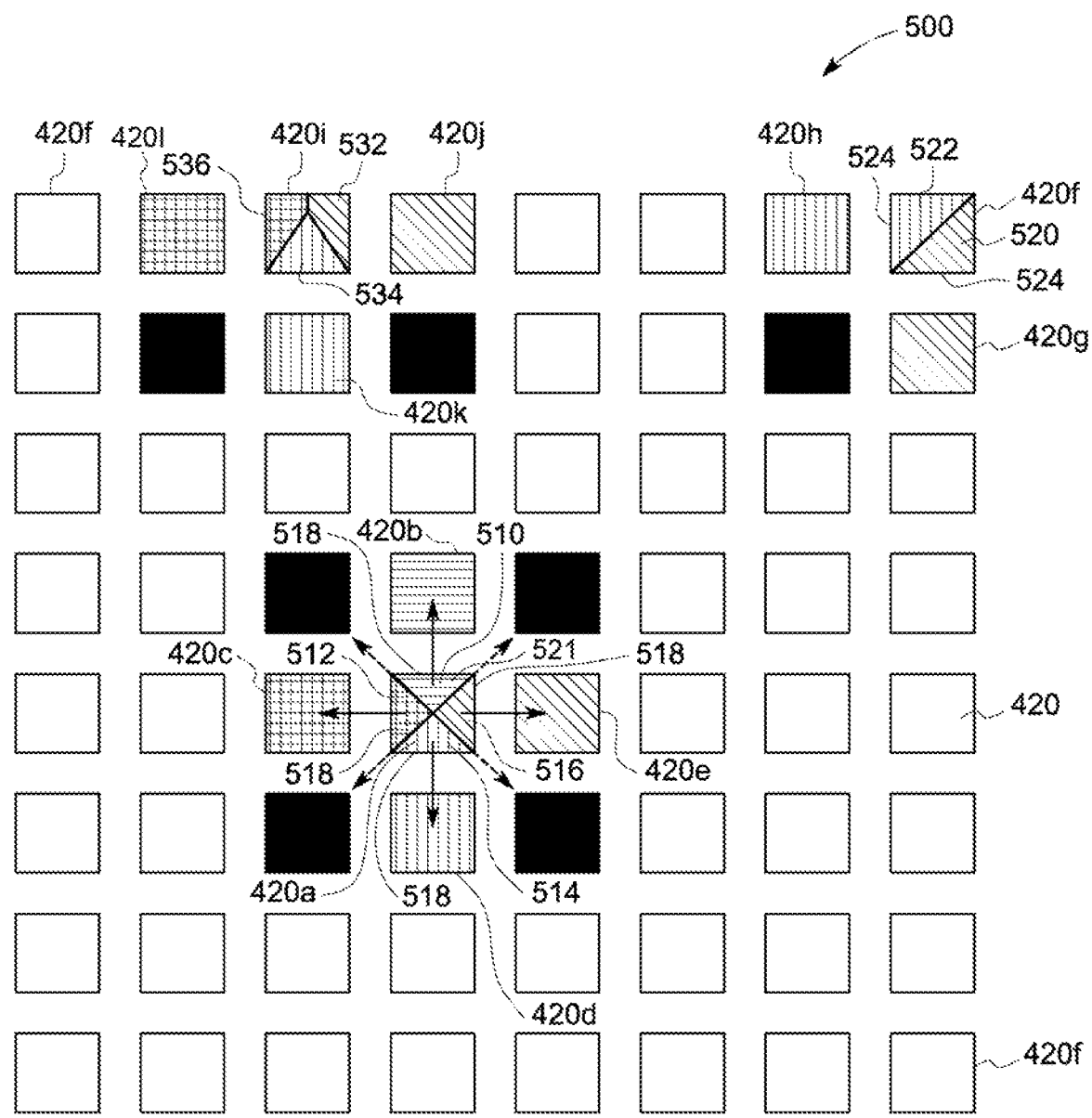
FIG. 5 depicts an example array of pixelated anodes in accordance with various embodiments.

FIG. 5 depicts an overhead view of an example array 500 of square-shaped pixelated anodes 420. The array 500 includes a first pixelated anode 420a that is surrounded by four surrounding pixelated anodes 420b, 420c, 420d, 420e. The first pixelated anode 420a is divided into four virtual sub-pixel portions 510, 512, 514, 516. In the illustrated example, each of the sub-pixel portions 510, 512, 514, and 516 are triangle-shaped, with each having a base 518 of the triangle that faces a corresponding surrounding pixelated anode. Namely, the base 518 of virtual sub-pixel portion 510 faces surrounding pixelated anode 420b, the base 518 of virtual sub-pixel portion 512 faces surrounding pixelated anode 420c, the base 518 of virtual sub-pixel portion 514 faces surrounding pixelated anode 420d, and the base 518 of virtual sub-pixel portion 516 faces surrounding pixelated anode 420e. Events re-directed to a given surrounding pixelated anode from the first pixelated anode 420a are assigned to the virtual sub-pixel portion having a base oriented toward or facing the surrounding pixelated anode that collects the re-directed charge.

For example, in FIG. 5, event 521 is received by the detector under the first pixelated anode 420a, and more particularly under the portion of the first pixelated anode 420a associated with virtual sub-pixel portion 510. After the event is identified as having a primary signal originating under the first pixelated anode 420a, the first pixelated anode 420a is disconnected to remove its voltage bias, and the charge is re-directed to the surrounding pixelated anode 420b that is pre-determined to correspond to the virtual sub-pixel portion 510. After the surrounding pixelated anode 420b collects the charge, it is identified as the surrounding pixelated anode to which the re-directed primary signal was directed, and the event is assigned to virtual sub-pixel portion 510 (which corresponds to the surrounding pixelated anode 420b). Similarly, events originating under virtual sub-pixel portion 512 are re-directed to surrounding pixelated anode 420c, with re-directed events collected by surrounding pixelated anode 420c assigned to virtual sub-pixel portion 512. Each virtual sub-pixel portion has one or more surrounding pixelated anodes associated therewith, with events from the corresponding associated one or more surrounding pixelated anodes assigned to the particular sub-pixel portion with which they are associated. By knowing under which pixelated anode an event originated, and which pixelated anode the charge was re-directed to, a virtual sub-pixel portion of the pixelated anode for which the event originated may be identified, and the event assigned to that virtual sub-pixel portion. A number of events may be identified in a similar manner, and all of the counted and identified events used to reconstruct an image.

It may be noted that other shapes of pixelated anodes and/or virtual pixel sub-portions may be used additionally or alternatively. For example, the depicted array 500 also includes corner pixelated anodes 420f. As seen in FIG. 5, the example corner pixelated anode 420f is square shaped and includes two triangle shaped sub-pixel portions 520, 522 each having a base 524 facing a corresponding surrounding pixelated anode 420g, 420h, respectively. Events re-directed from corner pixelated anode 420f to surrounding pixelated anode 420g and collected by surrounding pixelated anode 420g are assigned to virtual sub-pixel portion 520. Also, events re-directed from corner pixelated anode 420f to surrounding pixelated anode 420h and collected by surrounding pixelated anode 420h are assigned to virtual sub-pixel portion 522.

It may be noted that the above discussed example pixelated anodes 420a, 420f have symmetrical sub-pixel portions. Alternatively or additionally, asymmetrical sub-pixel portions may be employed. For example, example edge (or sidewall) pixelated anode 420i of the array 500 is divided into three asymmetrical sub-pixel portions 532, 534, 536 which correspond to surrounding pixelated anodes 420j, 420k, 420l, respectively. Use of asymmetrical sub-portions allows flexibility in assigning sub-portions to surrounding anodes that are asymmetrically disposed above a given anode (e.g., pixelated anodes disposed at edges and having surrounding anodes on some but not all sides). Accordingly, the example array 500 includes some pixelated anodes that are divided into equally sized symmetric sub-portions, and others that are divided into unequally sized asymmetric sub-portions. In the illustrated example, the virtual subpixels inside inland primary pixels have the same shape and are arranged symmetrically. However, in sidewall primary pixels, the attraction forces acting on the migrating events are not symmetrical in all directions. Accordingly, the shapes of the virtual pixels in the sidewall primary pixels are not identical and are not arranged symmetrically in all the different directions.

Figure 6:
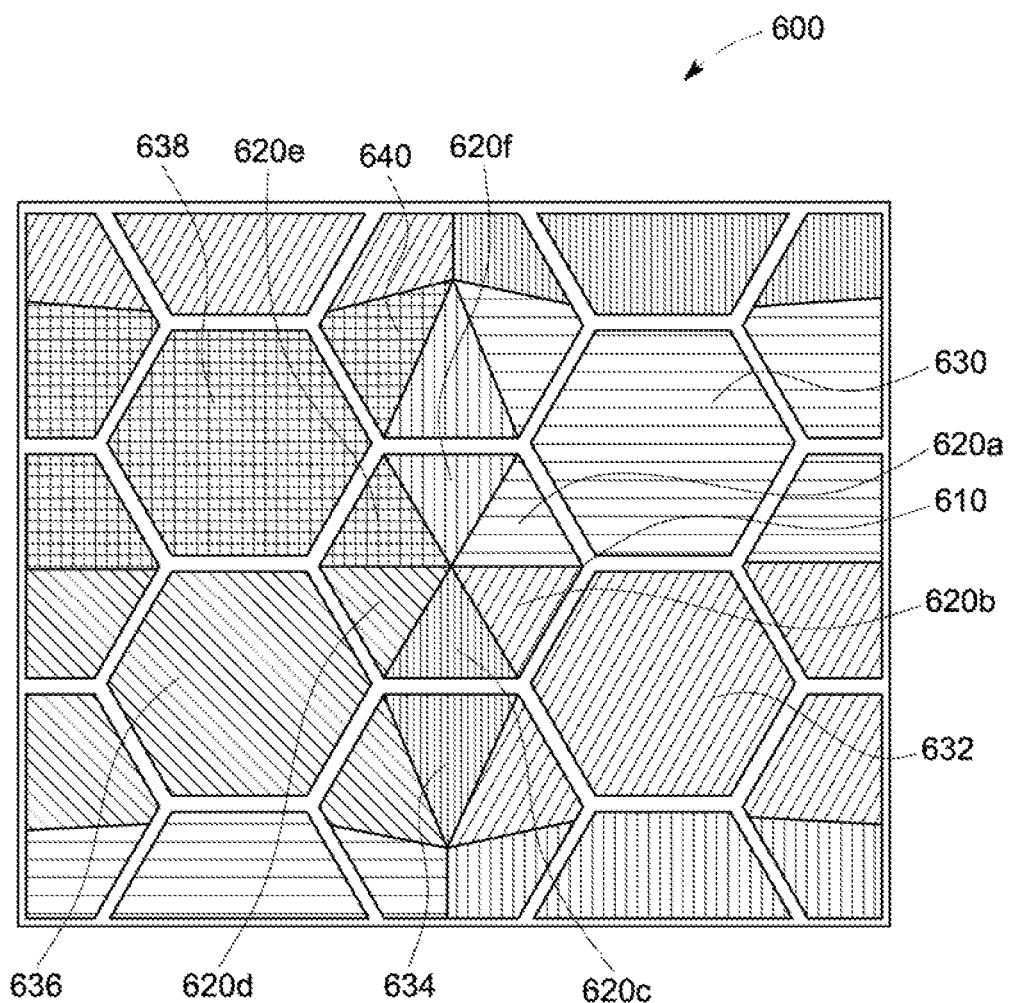
FIG. 6 depicts an example array of pixelated anodes in accordance with various embodiments.

Other shapes of pixelated anodes may be utilized as well. For example, FIG. 6 illustrates an example array 600 of hexagonal shaped pixelated anodes 610. As seen in FIG. 6, inland pixelated anode 610 is divided into six equally sized symmetrical virtual sub-portions: sub-portion 620a corresponding to surrounding anode 630, sub-portion 620b corresponding to surrounding anode 632, sub-portion 620c corresponding to surrounding anode 634, sub-portion 620d corresponding to surrounding anode 636, sub-portion 620e corresponding to surrounding anode 638, and sub-portion 620f corresponding to surrounding anode 640. It may be noted that edge pixelated anodes 634, 640 are divided into 5 unequally sized asymmetric portions. Hexagonal pixels divided into pie-shaped sub-portions as seen in FIG. 6 in various embodiments provide a lower number of electronic channels per area than square pixel divided into triangles as seen in FIG. 5.

Figure 7:
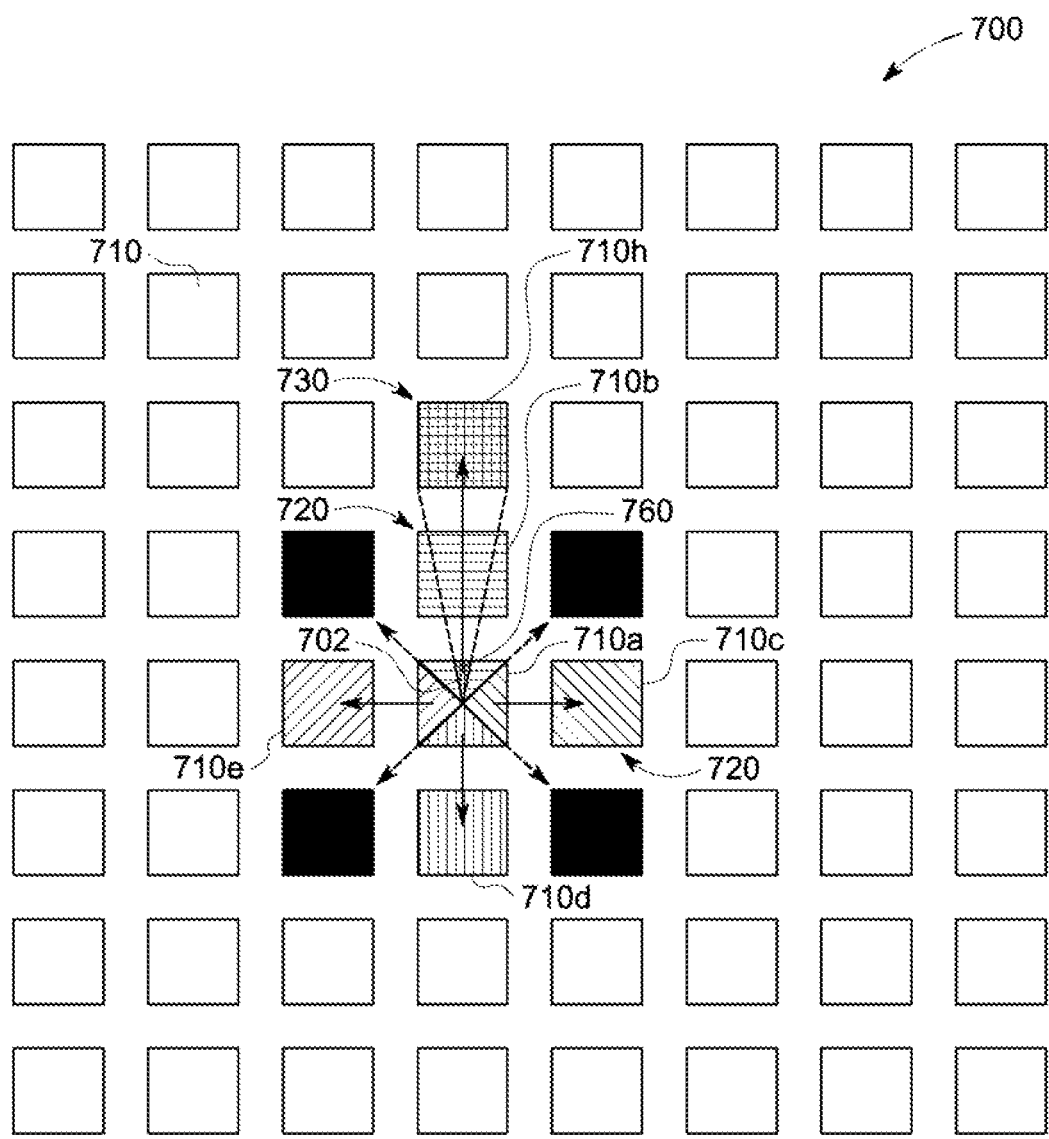
FIG. 7 depicts an example array of pixelated anodes in accordance with various embodiments.

Various examples of surrounding pixelated anodes discussed above have included pixelated anodes that are immediately adjacent to a primary pixelated anode, or anode under which an event originates. It should be noted that in various embodiments surrounding anodes may be used that are not immediately adjacent a primary anode. For example, FIG. 7 depicts an example array 700 of pixelated anodes 710. In the example array, pixelated anode 710a is a primary anode (e.g., event 702 originates under 710a). The pixelated anode 710a is surrounded by two levels or rings of surrounding anodes to which the charge from the event 702 may be redirected, depending on which portion of the pixelated anode 710a the event 702 originates under. In the illustrated example, the array 700 includes a first level 720 of immediately adjacent anodes. As seen in FIG. 7, the first level 720 is immediately adjacent to the pixelated anode 710a, and includes pixelated anodes 710b, 710c, 710d, and 710e. The array 700 also includes a second level 730 that is immediately adjacent to the first level 720 and disposed laterally outward of the second level 720 with respect to the pixelated anode 710a. Accordingly, the first level 720 is interposed between the second level 730 and the pixelated anode 710a. In the illustrated example, the second level 730 includes pixelated anode 710h which collects the charge for event 702 after pixelated anode 710a is disconnected. For events re-directed from pixelated anode 710a to pixelated anode 710h, the events are assigned to pixel sub-portion 760, which, as seen in FIG. 7, is smaller than the triangular sub-portions assigned to immediately adjacent pixelated anodes.

It may be noted that when the migration effect is strong, events may migrate from the disconnected primary pixel into a surrounding pixel that is not immediately adjacent to the primary pixel, and is instead one pixel away from the primary pixel, or separated from the primary pixel by one pixel, such as pixelated anode 710h in FIG. 7. In such a case, the events collected by a pixel in the second ring of neighbor pixels correspond to a smaller virtual subpixel (e.g., sub-portion 760) than sub-portions or sub-pixels that correspond to pixels immediately adjacent to the primary pixel, and accordingly have better intrinsic resolution. The strength of the migration effect may be affected by the following: value of the −HV voltage, detector thickness, width of anodes, pixel pitch, and mobility-lifetime product of the charge carriers in the detector bulk.

With continued reference to FIG. 4, it may be noted that in various embodiments the processing unit 430 generates a trigger via a triggering mechanism responsive to detecting an event corresponding to photon absorption to disconnect the pixel under which the event originated. The processing unit 430 may then log or record for which pixel the event was originated under for the trigger generation, and use the generation of the triggering event to identify the primary pixel. Then, the processing unit 430 may identify the neighboring or surrounding pixel associated with collection of the charge generated by the event to assign the event to a particular sub-pixel associated with the particular neighboring pixel. Further, in various embodiments, the processing unit 430 disables the triggering mechanism of surrounding pixelated anodes responsive to determining the presence of the primary signal in a given pixelated anode. Accordingly, the repeated re-direction of charge may be prevented.

Generally, in various embodiments the processing unit 430 includes processing circuitry configured to perform one or more tasks, functions, or steps discussed herein. It may be noted that "processing unit" as used herein is not intended to necessarily be limited to a single processor or computer. For example, the processing unit 430 may include multiple processors, ASIC's, FPGA's, and/or computers, which may be integrated in a common housing or unit, or which may distributed among various units or housings. It may be noted that operations performed by the processing unit 430 (e.g., operations corresponding to process flows or methods discussed herein, or aspects thereof) may be sufficiently complex that the operations may not be performed by a human being within a reasonable time period. For example, the determination of values of charges and determinations of when to operate switches to connect or disconnect components may rely on or utilize computations that may not be completed by a person within a reasonable time period.

The depicted processing unit 430 includes a memory 432. The memory 432 may include one or more computer readable storage media. The memory 432, for example, may store mapping information describing the locations of sub-pixels, association information corresponding particular surrounding anodes with corresponding sub-pixels, acquired emission information, image data corresponding to images generated, results of intermediate processing steps, calibration parameters or calibration information, or the like. Further, the process flows and/or flowcharts discussed herein (or aspects thereof) may represent one or more sets of instructions that are stored in the memory 432 for direction of operations of the radiation detection assembly 50.

Figure 8:
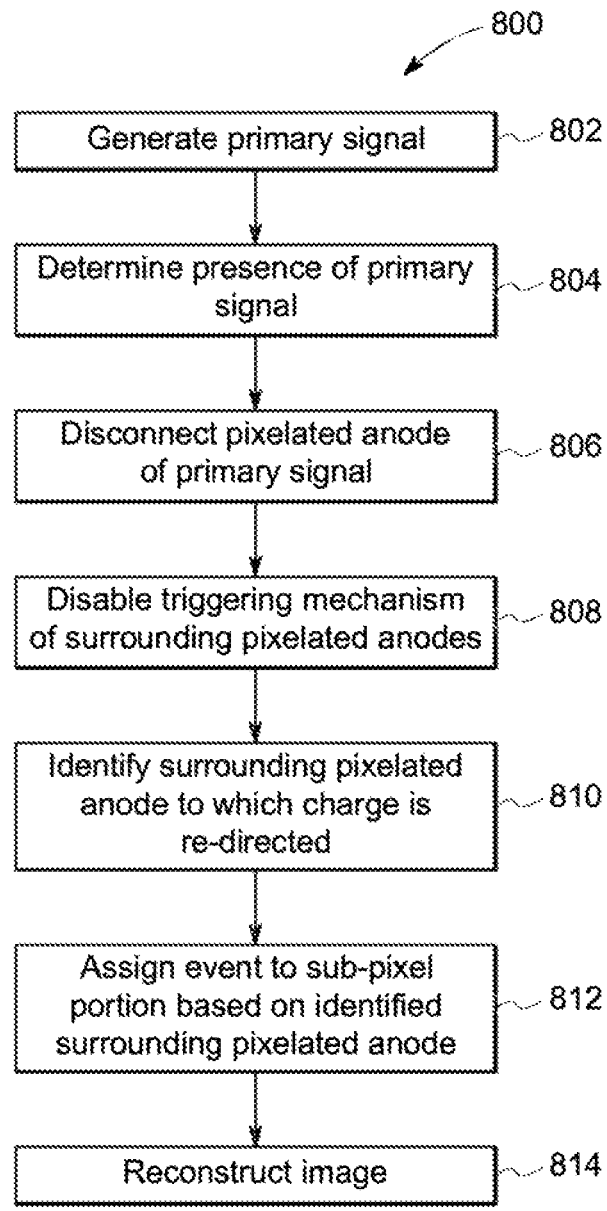
FIG. 8 provides a flowchart of a method in accordance with various embodiments.

FIG. 8 provides a flowchart of a method 800 (e.g., for imaging), in accordance with various embodiments. The method 800, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be able to be used as one or more algorithms to direct hardware (e.g., one or more aspects of the processing unit 430) to perform one or more operations described herein. The method 800 may be utilized in connection with detector assemblies discussed herein.

At 802, a primary signal is generated in a given pixelated anode of plural pixelated anodes (e.g., pixelated anodes 420). The pixelated anodes are disposed on the surface of a semiconductor detector. The primary signal is generated in response to a photon being absorbed in a volume or area associated with (e.g., underneath) the given pixelated anode.

At 804, the presence of the primary signal is determined or identified responsive to the primary signal reaching a trigger level. The trigger level or threshold in various embodiments is set high enough to avoid false identification of noise signals and/or false identification of secondary signals resulting from photon impacts on neighboring pixels.

At 806, the given pixelated anode (i.e., the pixelated anode for which the event originated) is disconnected from an electrical source. The disconnecting reduces or eliminates a voltage bias previously applied to the given pixelated anode, such that the given pixelated anode ceases to attract the charge from the event, causing a re-directed primary signal to be directed toward a surrounding pixelated anode. The given pixelated anode is disconnected responsive to determining the presence of the primary signal (e.g., based on the trigger level).

In the illustrated embodiment, 808, a triggering mechanism of surrounding pixelated anodes is also disabled responsive to determining the presence of the primary signal. Accordingly, the surrounding pixelated anodes are maintained at a bias voltage and can collect the charge from the event re-directed from the pixelated anode for which the event originated.

At 810, the surrounding pixelated anode to which the charge is re-directed is identified. For example, the surrounding pixelated anode in various embodiments is identified as the surrounding pixelated anode that collects the charge. Timing information (e.g., information describing the time at which the original impact pixel generated the trigger) and mapping information (e.g., information identifying pixels located near the original impact trigger) may be used to identify the collecting anode for a particular event.

At 812, an event is assigned or counted for the primary signal for the primary pixelated anode. The event is assigned to a pre-determined sub-pixel portion of the given pixelated anode for which the event originated. The pre-determined sub-pixel portion is identified or determined based on the pixelated anode that collected that charge. For example, the sub-pixel portions of the given pixelated anode may be pre-assigned to corresponding surrounding pixelated anodes based on proximity and/or orientation.

At 814 an image is reconstructed. After an amount of time during which counted events are accumulated and assigned to particular sub-pixel locations, all of the events for each sub-pixel portion are added, and the resulting total is used to determine the appearance of an image portion (e.g., a color, shade, and/or intensity) corresponding to the particular sub-pixel portion. Because sub-pixels are used, spatial resolution is improved.

Figure 9:
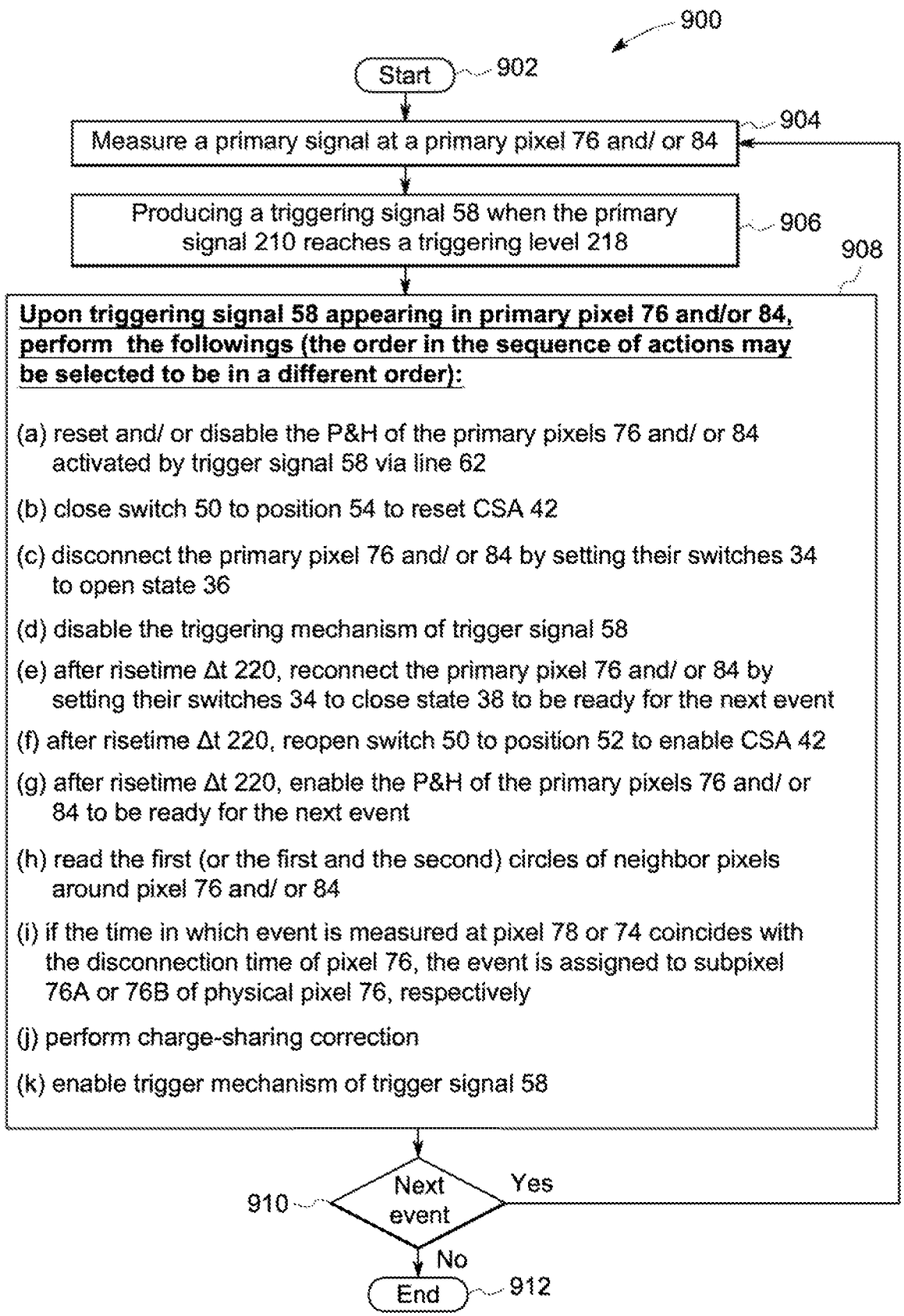
FIG. 9 provides a flowchart of a method in accordance with various embodiments.

FIG. 9 provides a flowchart of a method 900 in accordance with various embodiments. The method 900, for example, may be used in conjunction with method 800, or aspects thereof. It should be noted that the particular component labels and/or parameter values specified in the illustrated flowchart are provided by way of example, and that other components and/or parameter values may be used in other embodiments.

At 902, the method 900 starts. At 904, a primary signal is measured at a pixel under which an event is absorbed. At 906, a trigger signal is produced. For example, the trigger signal may be produced when the measured primary signal reaches a threshold or trigger level.

At 908, a number of sub-steps are performed to re-direct the primary signal to a neighboring pixel, and to use the location of the collecting pixel to determine a sub-pixel location to be assigned for the event, as discussed herein (e.g., in connection with FIGS. 1-8). The reference numbers referred to in the particular sub-steps of the example correspond to the reference numbers used in FIGS. 1-3. Again, it should be noted that the particular components and values provided in connection with FIG. 9 are by way of example. It may be noted that trigger signals for adjacent pixels in various embodiments are enabled/disabled as well as the trigger signal for the collecting pixel.

Figure 10:
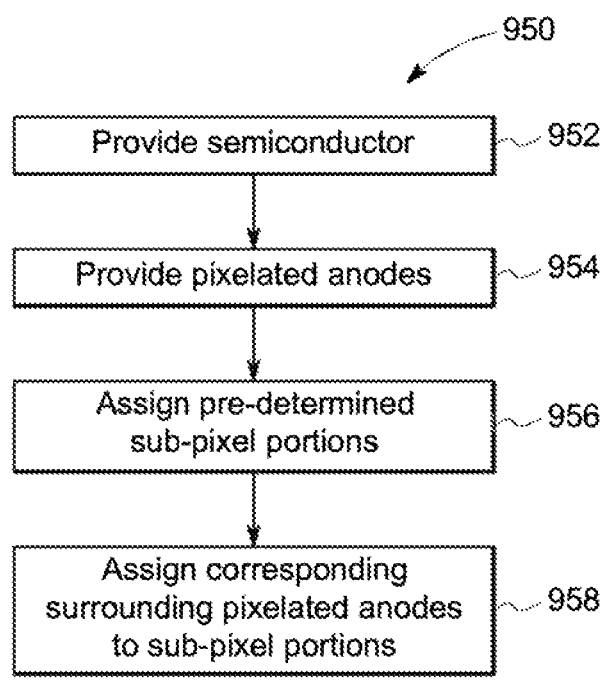
FIG. 10 provides a flowchart of a method in accordance with various embodiments.

FIG. 10 provides a flowchart of a method 950 (e.g., for assembling a radiation detector assembly), in accordance with various embodiments. The method 950, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. The method 950 may be utilized in connection with detector assemblies discussed herein.

At 952, a semiconductor detector (e.g., semiconductor detector 410) is provided. The semiconductor detector has sidewalls and a surface.

At 954, plural pixelated anodes (e.g., pixelated anodes 420) are provided. The anodes are disposed on the surface of the semiconductor detector. In various embodiments, the anodes are provided as part of an array (e.g., array 500). Each of the anodes are configured to generate a primary signal responsive to reception of a photon by the pixelated anode (e.g., absorption of the photon by semiconductor bulk disposed underneath the particular pixelated anode). In various embodiments, the pixelated anodes are coupled to a processing unit and/or other electronic components that are configured to selectively disconnect each anode responsive to determination of a primary signal being generated for the anode. Accordingly, the charge for the corresponding event is re-directed to a surrounding anode after the anode for which the primary signal originated is disconnected (e.g., via movement of a switch for the particular anode from a closed state to an open state).

At 956, predetermined sub-pixel portions are assigned to at least one of plural pixelated anodes. In some embodiments, differently shaped sub-pixel portions may be assigned to different anodes of the same array. For example, as discussed herein, for an array of square shaped pixels, 4 equally sized and symmetric triangular sub-pixel portions may be assigned to inland pixels. Corner pixels may be assigned 2 equally sized and symmetric triangular sub-pixel portions, and edge or sidewall pixels may be assigned differently sized, asymmetric sub-pixel portions. As another example, hexagonal inland pixels may be assigned 6 equally sized and symmetric pie-shaped portions.

At 958, a corresponding surrounding pixelated anode is assigned to each sub-pixel portion. The surrounding pixelated anode may be immediately adjacent to the pixelated anode of the sub-pixel portion it is assigned to, or may be separated (e.g., in a second ring or level as discussed herein). An event received by the radiation detector is assigned to a particular sub-pixel portion of the anode receiving the event based on an identification of a re-directed primary signal in the surrounding pixelated anode that corresponds to the particular sub-pixel portion as discussed herein.

Figure 11:
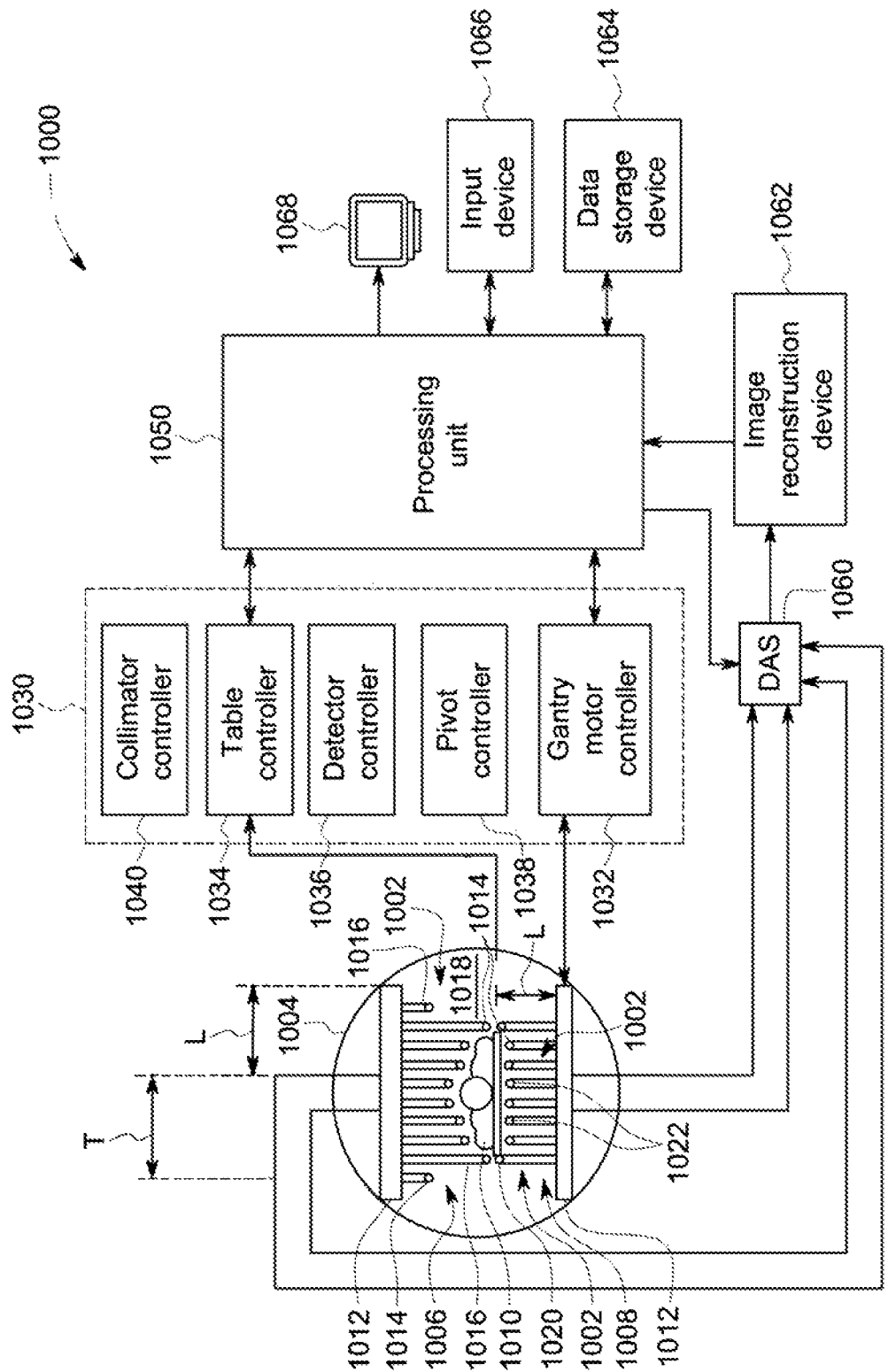
FIG. 11 provides a schematic view of an imaging system in accordance with various embodiments.

FIG. 11 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). In particular, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 11. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 11). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels. In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

In various embodiments, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially as described in more detail herein.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually as described in more detail herein. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 11). In various embodiments, the detector controller 1036 may control the detector carriers 1016 or the support members 1012 to move in different lateral directions. Detector controller 1036 may control the swiveling motion of detectors 1002 together with their collimators 1022.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 11 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Figure 12:
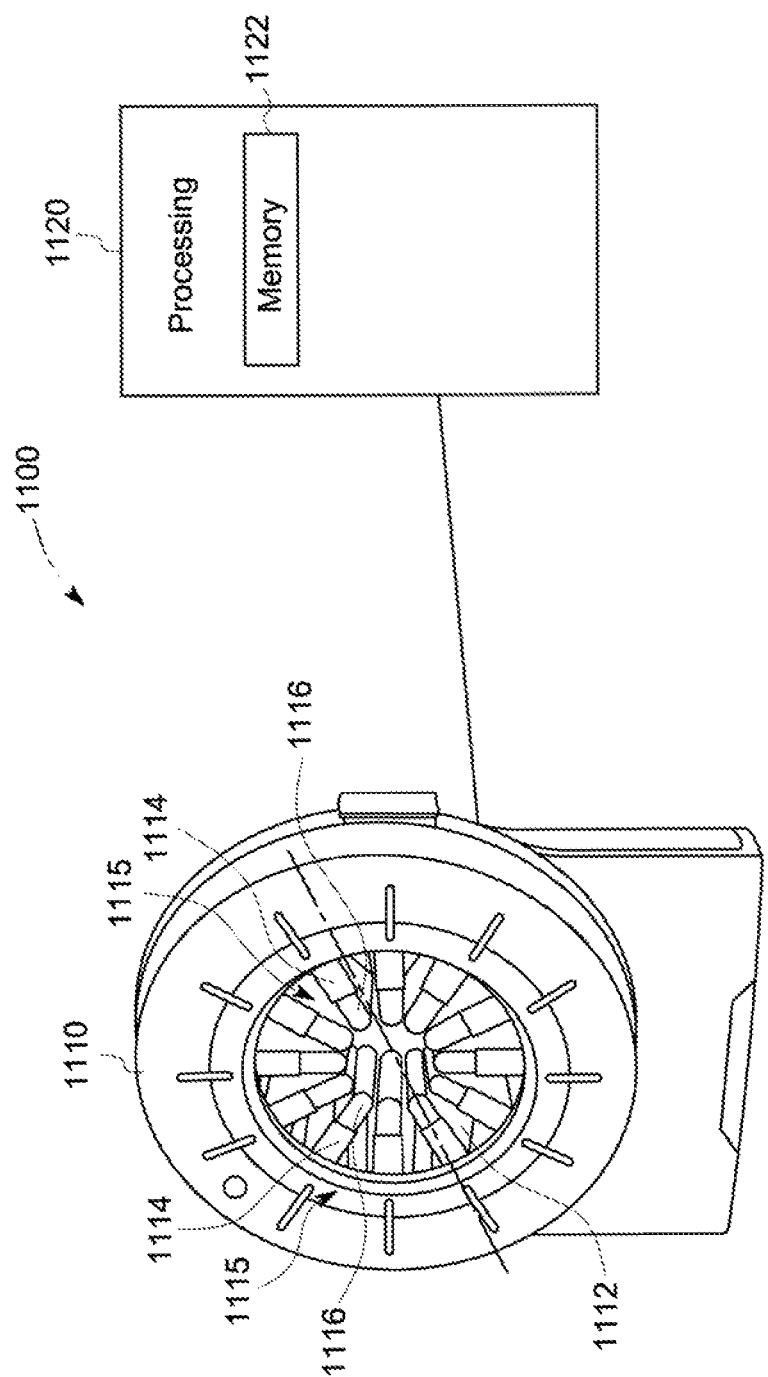
FIG. 12 provides a schematic view of an imaging system in accordance with various embodiments.

It may be noted that the embodiment of FIG. 11 may be understood as a linear arrangement of detector heads (e.g., utilizing detector units arranged in a row and extending parallel to one another. In other embodiments, a radial design may be employed. Radial designs, for example, may provide additional advantages in terms of efficiently imaging smaller objects, such as limbs, heads, or infants. FIG. 12 provides a schematic view of a nuclear medicine (NM) multi-head imaging system 1100 in accordance with various embodiments. Generally, the imaging system 1100 is configured to acquire imaging information (e.g., photon counts) from an object to be imaged (e.g., a human patient) that has been administered a radiopharmaceutical. The depicted imaging system 1100 includes a gantry 1110 having a bore 1112 therethrough, plural radiation detector head assemblies 1115, and a processing unit 1120.

The gantry 1110 defines the bore 1112. The bore 1112 is configured to accept an object to be imaged (e.g., a human patient or portion thereof). As seen in FIG. 12, plural radiation detector head assemblies 1115 are mounted to the gantry 1110. In the illustrated embodiment, each radiation detector head assembly 1115 includes an arm 1114 and a head 1116. The arm 1114 is configured to articulate the head 1116 radially toward and/or away from a center of the bore 1112 (and/or in other directions), and the head 1116 includes at least one detector, with the head 1116 disposed at a radially inward end of the arm 1114 and configured to pivot to provide a range of positions from which imaging information is acquired.

The detector of the head 1116, for example, may be a semiconductor detector. For example, a semiconductor detector various embodiments may be constructed using different materials, such as semiconductor materials, including Cadmium Zinc Telluride (CdZnTe), often referred to as CZT, Cadmium Telluride (CdTe), and Silicon (Si), among others. The detector may be configured for use with, for example, nuclear medicine (NM) imaging systems, positron emission tomography (PET) imaging systems, and/or single photon emission computed tomography (SPECT) imaging systems.

In various embodiments, the detector may include an array of pixelated anodes, and may generate different signals depending on the location of where a photon is absorbed in the volume of the detector under a surface if the detector. The volumes of the detector under the pixelated anodes are defined as voxels. For each pixelated anode, the detector has a corresponding voxel. The absorption of photons by certain voxels corresponding to particular pixelated anodes results in charges generated that may be counted. The counts may be correlated to particular locations and used to reconstruct an image.

In various embodiments, each detector head assembly 1115 may define a corresponding view that is oriented toward the center of the bore 1112. Each detector head assembly 1115 in the illustrated embodiment is configured to acquire imaging information over a sweep range corresponding to the view of the given detector unit. Additional details regarding examples of systems with detector units disposed radially around a bore may be found in U.S. patent application Ser. No. 14/788,180, filed 30 Jun. 2015, entitled "Systems and Methods For Dynamic Scanning With Multi-Head Camera," the subject matter of which is incorporated by reference in its entirety.

The processing unit 1120 includes memory 1122. The imaging system 1100 is shown as including a single processing unit 1120; however, the block for the processing unit 1120 may be understood as representing one or more processors that may be distributed or remote from each other. The depicted processing unit 1120 includes processing circuitry configured to perform one or more tasks, functions, or steps discussed herein. It may be noted that "processing unit" as used herein is not intended to necessarily be limited to a single processor or computer. For example, the processing unit 1120 may include multiple processors and/or computers, which may be integrated in a common housing or unit, or which may distributed among various units or housings.

Generally, various aspects (e.g., programmed modules) of the processing unit 1120 act individually or cooperatively with other aspects to perform one or more aspects of the methods, steps, or processes discussed herein. In the depicted embodiment, the memory 1122 includes a tangible, non-transitory computer readable medium having stored thereon instructions for performing one or more aspects of the methods, steps, or processes discussed herein.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A radiation detector assembly comprising:
a semiconductor detector having sidewalls and a surface;
plural pixelated anodes disposed on the surface, each pixelated anode configured to generate a primary signal responsive to reception of a photon by the semiconductor detector under the pixelated anode; and
at least one processor operably coupled to the pixelated anodes, the at least one processor configured to:
determine when a primary signal is generated by a given pixelated anode;
responsive to determining the presence of the primary signal in the given pixelated anode, disconnect the given pixelated anode from an electrical source, wherein a re-directed primary signal is directed to a surrounding pixelated anode of the given pixelated anode;
identify the surrounding pixelated anode; and
assign an event for the primary signal to a pre-determined sub-pixel portion of the given pixelated anode based on the identified surrounding pixelated anode.

2. The radiation detector assembly of claim 1, wherein each pixelated anode comprises plural sub-pixel portions, each sub-pixel portion corresponding to at least one surrounding pixelated anode.

3. The radiation detector assembly of claim 2, wherein at least some of the pixelated anodes are square shaped, and have four triangle shaped sub-pixel portions each having a base facing a corresponding surrounding pixelated anode.

4. The radiation detector assembly of claim 2, wherein the plural pixelated anodes include corner anodes, the corner anodes being square shaped and having two triangle shaped sub-pixel portions each having a base facing a corresponding surrounding pixelated anode.

5. The radiation detector assembly of claim 2, wherein some of the pixelated anodes have symmetrical sub-pixel portions and others of the pixelated anodes have asymmetrical sub-pixel portions.

6. The radiation detector assembly of claim 2, wherein the plural pixelated anodes are hexagonal shaped.

7. The radiation detector assembly of claim 1, wherein the given pixelated anode has two levels of surrounding pixelated anodes including a first level of immediately adjacent anodes, wherein the first level is interposed between a second level and the given pixelated anode.

8. The radiation detector assembly of claim 1, wherein the processing unit is configured to disable a triggering mechanism of surrounding pixelated anodes responsive to the determining of the presence of the primary signal in the given pixelated anode.

9. A method for imaging comprising:
generating a primary signal in a given pixelated anode of plural pixelated anodes disposed on a surface of a semiconductor detector responsive reception of a photon by the semiconductor detector under the given pixelated anode;
determining the presence of the primary signal responsive to the primary signal reaching a trigger level;
responsive to determining the presence of a primary signal in a given pixelated anode, disconnecting the given pixelated anode from an electrical source, wherein a re-directed primary signal is directed to a surrounding pixelated anode of the given pixelated anode;
identifying the surrounding pixelated anode; and
assigning an event for the primary signal to a pre-determined sub-pixel portion of the given pixelated anode based on the identified surrounding pixelated anode.

10. The method of claim 9, wherein each pixelated anode comprises plural sub-pixel portions, each sub-pixel portion corresponding to at least one surrounding pixelated anode.

11. The method of claim 10, wherein at least some of the pixelated anodes are square shaped, and have four triangle shaped sub-pixel portions each having a base facing a corresponding surrounding pixelated anode.

12. The method of claim 10, wherein the plural pixelated anodes include corner anodes, the corner anodes being square shaped and having two triangle shaped sub-pixel portions each having a base facing a corresponding surrounding pixelated anode.

13. The method of claim 10, wherein some of the pixelated anodes have symmetrical sub-pixel portions and others of the pixelated anodes have asymmetrical sub-pixel portions.

14. The method of claim 10, wherein the plural pixelated anodes are hexagonal shaped.

15. The method of claim 9, wherein the given pixelated anode has two levels of surrounding pixelated anodes including a first level of immediately adjacent anodes, wherein the first level is interposed between a second level and the given pixelated anode.

16. The method of claim 9, further comprising disabling a triggering mechanism of surrounding pixelated anodes responsive to the determining of the presence of the primary signal in the given pixelated anode.

17. A method for providing a radiation detector assembly comprising:

providing a semiconductor detector having sidewalls and a surface;

providing plural pixelated anodes disposed on the surface, each pixelated anode configured to generate a primary signal responsive to reception of a photon by the semiconductor detector under the pixelated anode;

assigning predetermined sub-pixel portions to at least one of the plural pixelated anodes;

assigning a corresponding surrounding pixelated anode to each sub-pixel portion, wherein the radiation detector assembly is configured to assign an event to at least one sub-pixel portion of the at least one pixelated anode when the at least one pixelated anode generates the primary signal, based on identification of a re-directed primary signal in the corresponding surrounding pixelated anode.

18. The method of claim 17, wherein at least some of the pixelated anodes are square shaped, and have four triangle shaped sub-pixel portions each having a base facing a corresponding surrounding pixelated anode.

19. The method of claim 17, wherein the plural pixelated anodes include corner anodes, the corner anodes being square shaped and having two triangle shaped sub-pixel portions each having a base facing a corresponding surrounding pixelated anode.

20. The method of claim 17, wherein the plural pixelated anodes are hexagonal shaped.

* * * * *